(12) United States Patent
van de Loecht

(10) Patent No.: US 9,067,739 B2
(45) Date of Patent: Jun. 30, 2015

(54) TRANSPORT SYSTEM HAVING A LOCK DEVICE

(75) Inventor: Heinrich van de Loecht, Muggensturm (DE)

(73) Assignee: Robert Bosch GmbH, Stuttgart (DE)

( * ) Notice: Subject to any disclaimer, the term of this patent is extended or adjusted under 35 U.S.C. 154(b) by 143 days.

(21) Appl. No.: 14/114,353

(22) PCT Filed: Mar. 2, 2012

(86) PCT No.: PCT/EP2012/053638
§ 371 (c)(1),
(2), (4) Date: Oct. 28, 2013

(87) PCT Pub. No.: WO2012/146424
PCT Pub. Date: Nov. 1, 2012

(65) Prior Publication Data
US 2014/0054138 A1 Feb. 27, 2014

(30) Foreign Application Priority Data
Apr. 26, 2011 (DE) .......................... 10 2011 017 525

(51) Int. Cl.
*B65G 21/22* (2006.01)
*B65G 17/00* (2006.01)
*B65G 21/10* (2006.01)
*B65G 21/16* (2006.01)
*B65G 21/06* (2006.01)
(Continued)

(52) U.S. Cl.
CPC ................ *B65G 21/22* (2013.01); *B65G 17/00* (2013.01); *B65G 21/10* (2013.01); *B65G 21/16* (2013.01); *B65B 35/10* (2013.01); *B65G 21/06* (2013.01); *B65G 35/06* (2013.01)

(58) Field of Classification Search
CPC ........ B65G 17/00; B65G 21/10; B65G 21/16; B65G 21/22
USPC ........ 198/793, 802, 860.2, 861.1, 860.1, 717, 198/723, 729, 735.1, 735.2
See application file for complete search history.

(56) References Cited

U.S. PATENT DOCUMENTS 5,267,640 A * 12/1993 Kerklies et al. ................ 198/607
5,314,059 A * 5/1994 Clopton ..................... 198/860.1
(Continued)

FOREIGN PATENT DOCUMENTS

| CH | 680283 | 7/1992 |
|---|---|---|
| CH | 701855 | 3/2011 |

(Continued)

OTHER PUBLICATIONS

International Search Report for Application No. PCT/EP2012/053638 dated May 16, 2012 (2 pages).

*Primary Examiner* — Leslie A Nicholson, III
(74) *Attorney, Agent, or Firm* — Michael Best & Friedrich LLP

(57) ABSTRACT

The invention relates to a transport system comprising a circumferentially closed transport section (2) that has a plurality of section parts, wherein the section parts comprise linear section parts (3) and curved section parts (4), wherein at least one of the curved section parts (4) has a U-shaped curve section (40) that defines a 180° deflection, at least one runner (7) that can be moved along the transport section (2) in order to transport objects, and a lock device (5) that is arranged between the U-shaped curve section (40) and adjacent section parts.

19 Claims, 4 Drawing Sheets

(51) Int. Cl.
  *B65B 35/10* (2006.01)
  *B65G 35/06* (2006.01)

(56) References Cited

U.S. PATENT DOCUMENTS

| | | | |
|---|---|---|---|
| 6,644,211 B2 * | 11/2003 | Baier et al. | 104/172.4 |
| 6,752,261 B1 * | 6/2004 | Gaeddert et al. | 198/861.1 |
| 6,876,107 B2 * | 4/2005 | Jacobs | 310/12.19 |
| 7,748,522 B2 * | 7/2010 | Reiner | 198/836.1 |
| 2003/0230941 A1 | 12/2003 | Jacobs | |
| 2008/0289931 A1 | 11/2008 | Veile et al. | |

FOREIGN PATENT DOCUMENTS

| | | |
|---|---|---|
| DE | 102007024446 | 11/2008 |
| EP | 0713834 | 5/1996 |

* cited by examiner

TRANSPORT SYSTEM HAVING A LOCK DEVICE

BACKGROUND OF THE INVENTION

The present invention relates to a transport system for conveying a product for charging packaging machines, in particular horizontal tubular bag machines or cartooning machines, with bulk goods.

Transport systems comprising a circumferential transport section for runners, which are driven independently of one another and charge packaging machines with products, are known from the prior art in various embodiments. In order to mount or dismount the runners, the transport section between two section parts has to be opened or, respectively, closed again using dismounting and mounting processes that are time and effort consuming. A precise fine adjustment of the connected section parts is required again, which is very time consuming.

SUMMARY OF THE INVENTION

The inventive transport system has in contrast the advantage that the transport section between two section parts can be easily opened to mount or dismount runners. This is achieved by virtue of the fact that the transport system comprises a circumferentially closed transport section that has a plurality of section parts, wherein the section parts comprise linear section parts and curved section parts and at least one runner that can be moved along the transport section in order to transport objects. At least one of the curved section parts has in this case a U-shaped curve section that defines a 180° deflection. In addition, a lock device is provided which is arranged between the U-shaped curve section and section parts adjacent thereto. The lock device facilitates an opening and closing of the transport section in a simplified dismounting or mounting process, which can be executed without a large expenditure of time. In so doing, changeover and servicing times can be drastically reduced. The U-shaped curve section is furthermore very dimensionally stable and rigid.

The lock device preferably comprises at least one first rod-shaped guide element and a second rod-shaped guide element. The first guide element connects a first free end of the U-shaped curve section to a first adjacent section part; and the second guide element connects a second free end of the U-shaped curve section to a second adjacent section part. In order to facilitate detachment from the adjacent section parts, the U-shaped curve section is furthermore designed, such that it can be removed or be partially pulled off from said adjacent section parts via the rod-shaped guide elements. As a result, the runners can be dismounted from or mounted to the transport section very quickly. In addition, a simple design having an unchanged construction volume of the transport system is achieved. The rod-shaped guide elements further ensure that a readjustment of the section parts with respect to one another is not necessary after reassembly.

In a particularly preferred manner, the lock device comprises at least one eccentric element for changing a relative position between the U-shaped curve section and adjacent section parts. As a result, a simple, continuously variable and reproducible positioning of the section parts is made possible.

According to a further preferred embodiment of the invention, a first eccentric element is disposed at the first rod-shaped guide element, and a second eccentric element is disposed at the second rod-shaped guide element. In so doing, a cost-effective, precise adjustment of the section parts with respect to one another is made possible with a minimum number of components. In addition, the adjustment of the lock device has to be performed only once, and a manual fine positioning is not required after each closing of the lock device.

The first rod-shaped guide element and a third rod-shaped guide element are preferably disposed at a first free end of the curve section, wherein an eccentric element is arranged at each of the rod-shaped guide elements, the eccentric elements being arranged in directions perpendicular to one another. Without a large number of tools being required and great deal of time being expended, an exact alignment of the curve section with respect to the adjacent section part is thereby possible in the millimeter range in two perpendicular guide planes or, respectively, degrees of freedom that are independent of one another, i.e. in the longitudinal direction parallel to the direction of movement as well as perpendicular to the direction of movement of the transport section. In addition, an error-tolerant guide system is thereby provided, in which manufacturing tolerances of the individual components can be compensated by adjusting the components with respect to one another.

The rod-shaped guide element further preferably has an elongated hole which is continuous in a direction perpendicular to the longitudinal direction of the guide element and in which an eccentric element is disposed. In a further preferable embodiment, the elongated hole has a length in the longitudinal direction which is greater than the length of the runner in the direction of movement. After releasing the eccentric element, the guide element can thus be pulled out to such an extent in the direction of movement that a runner currently at hand can be manually dismounted without tilting it and without tools and/or a new runner can be installed.

The transport system furthermore preferably comprises a fourth rod-shaped guide element, wherein the fourth rod-shaped guide element and the second rod-shaped guide element are disposed at a second free end of the curve section, wherein an eccentric element is disposed at each rod-shaped guide element, the eccentric elements being disposed in perpendicular directions with respect to each other. Just like at the first free end, an exact alignment of the curve section with respect to the correspondingly other adjacent section part can thereby be performed and manufacturing tolerances of the two components can be compensated.

A separating slot is furthermore preferably provided in the section part adjacent to the U-shaped curve section, which separating slot divides the adjacent section part in a first part and a second part, the U-shaped curve section being fixed exclusively to the first part. As a result of the separating slot, the adjacent section part is flexibly designed and can be displaced or, respectively, adjusted via the two eccentric elements in relation to the U-shaped curve section transversely to the direction of movement. In so doing, transitions between the U-shaped curved section part and the adjacent section parts of the transport section can be implemented with a tolerance of ±0.01 mm which ensures a fail-safe conveyance of the runners.

BRIEF DESCRIPTION OF THE DRAWINGS

An exemplary embodiment of the invention is described below in detail with reference to the accompanying drawings. In the drawings.

DETAILED DESCRIPTION

A transport system 1 for transporting articles in accordance with a preferred exemplary embodiment of the invention is described below in detail with reference to FIGS. 1 to 4. The transport system 1 comprises a plurality of linear and curved section parts which can be assembled to form a desired transport section 2.

Figure 1:
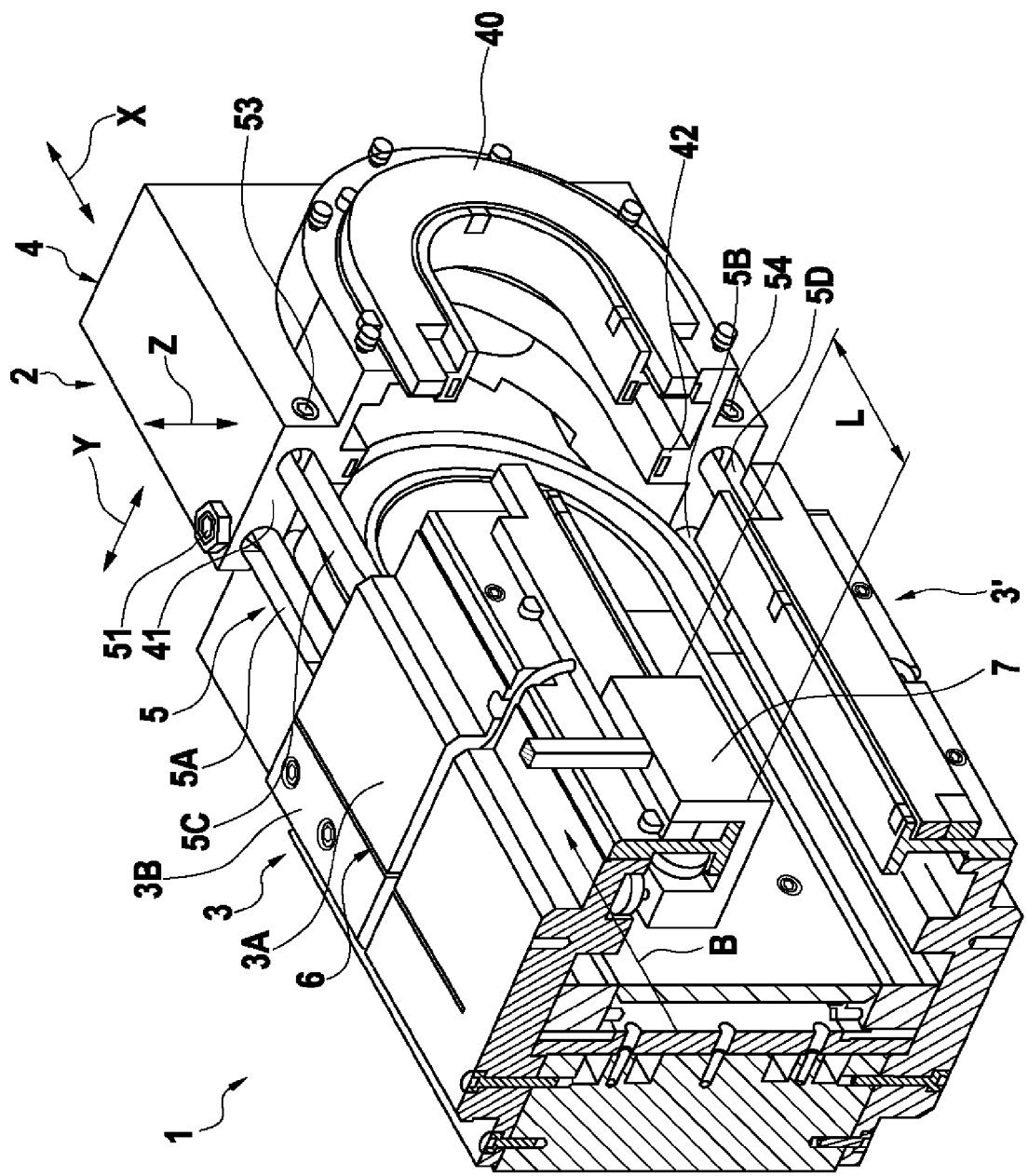
FIG. 1 shows a schematic, perspective partial view of an inventive transport system pursuant to a preferred exemplary embodiment of the invention, in the open state.

As is illustrated in FIG. 1, the transport system 1 comprises particularly two linear section parts 3, 3' and a curved section part 4 which is disposed therebetween and has a U-shaped curve section 40 that defines a 180° deflection of the transport section 2. A lock device 5 is furthermore provided between the U-shaped curve section 40 and the respectively adjacent linear section parts, 3, 3', by means of which the transport section 2 can be opened or closed in the direction of a double arrow X.

As can further be seen from FIG. 1, the lock device 5 comprises a first rod-shaped guide element 5A, a second rod-shaped guide element 5B, a third rod-shaped guide element 5C and a fourth rod-shaped guide element 5D. The first and third guide elements 5A and 5C are pressed here in a play free manner into corresponding boreholes, which are not visible here, of the first linear section part 3 and are secured against axial displacement as well. Said first and third guide elements 5A and 5C thereby connect a first free end 41 of the U-shaped curve section 40 to the first linear section part 3. The second and fourth guide elements 5B and 5D are likewise pressed in a play free manner into corresponding boreholes of the second linear section part 3', which are not visible here, and secured against axial displacement as well. Said second and fourth guide elements 5B and 5D thereby connect a second free end 42 of the U-shaped curve section 40 to the second adjacent linear section part 3'.

The lock device 5 has further a first eccentric element 51 at the first guide element 5A and a third eccentric element 53 at the third guide element 5C. In addition, a second eccentric element 52 (cf. FIG. 3), which is not visible here, is disposed at the second guide element 5B as well as a fourth eccentric element 54 at the fourth guide element 5D.

Figure 3:
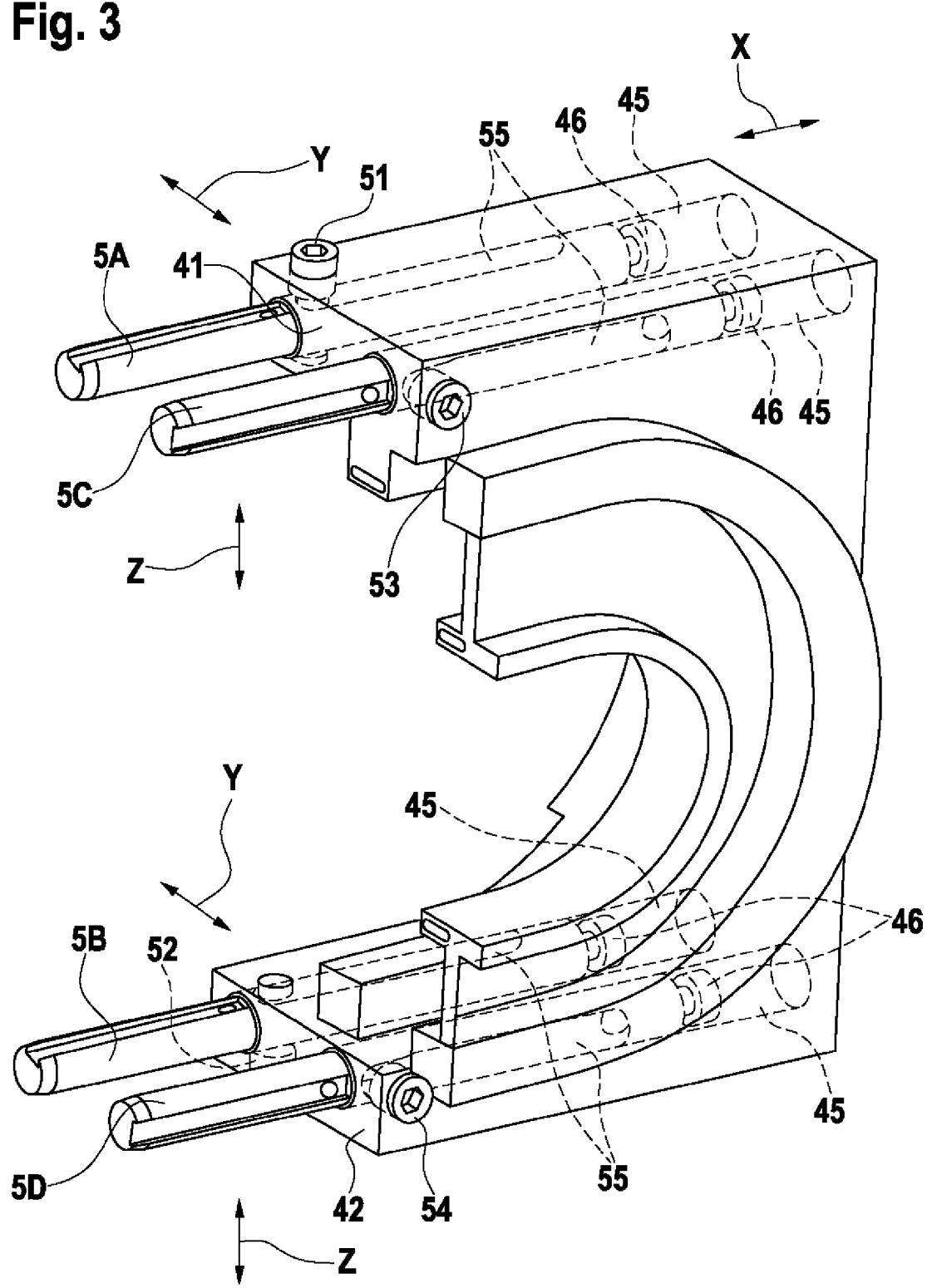
FIG. 3 shows a schematic perspective depiction of a curved section part together with an integrated lock device.
Figure 4:
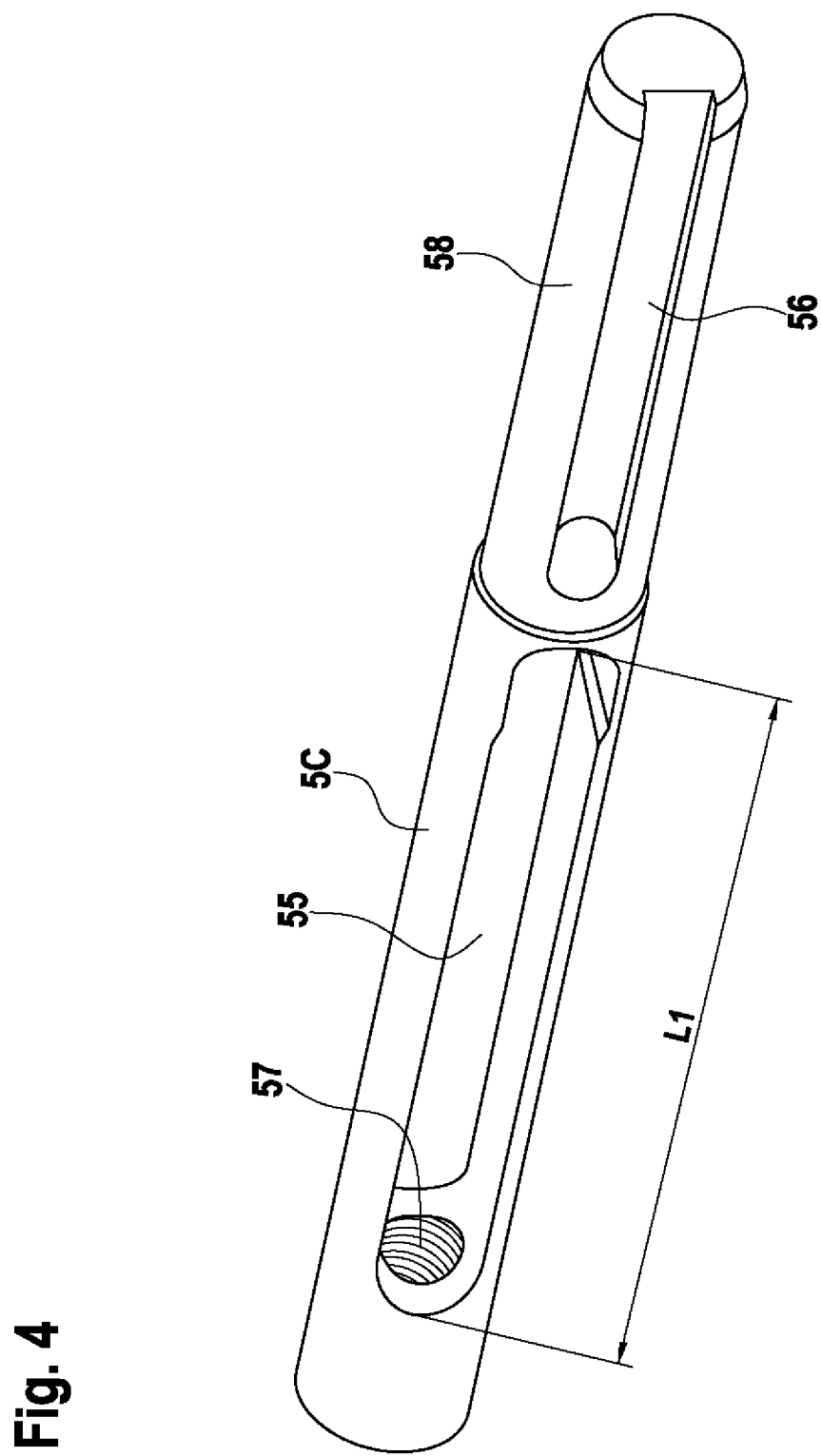
FIG. 4 shows a perspective depiction of a guide element of the lock device from FIG. 3.

The guide elements 5A, 5B, 5C, 5D are fixed to the U-shaped curve section 40 by means of screws 46 which are arranged in openings 45 and are screwed into a thread 57 of the respective guide element 5A, 5B, 5C, 5D (FIG. 3). As is illustrated in FIG. 4, which shows the guide element 5C by way of example, the end 58 of the guide elements 5A, 5B, 5C, 5D opposite to the thread 57 is of conical design with a recessed flat portion 56 which is arranged on the outer circumference in the same radial direction as a respective elongated hole 55. The ends 58 of the guide elements 5A, 5B, 5C, 5D are fixed to the adjoining linear section parts 3, 3' by means of screw connections, which are not depicted here, in a form fitting or force fitting manner.

As is depicted in FIG. 3, all guide elements 5A, 5B, 5C, 5D comprise an elongated hole 55 which is continuous in a direction perpendicular to the longitudinal direction of the guide elements 5A, 5B, 5C, 5D, has a length L1 (cf. FIG. 4) and in which the respective eccentric element 51, 52, 53 or 54 is fitted. By means of the eccentric elements 51 and 52 which are disposed vertically or, respectively, in a direction Z, the U-shaped curve section 40 can be adjusted, with respect to the first and second linear section parts 3, 3', in the direction Y perpendicular to a direction of movement B (see FIG. 1). The eccentric elements 53 and 54 which are disposed horizontally or, respectively, in the direction Y make possible an adjustment of the U-shaped curve section 40, with respect to the first and second linear section parts 3, 3', in a direction Z designated by a double arrow transverse to the direction of movement B.

Figure 2:
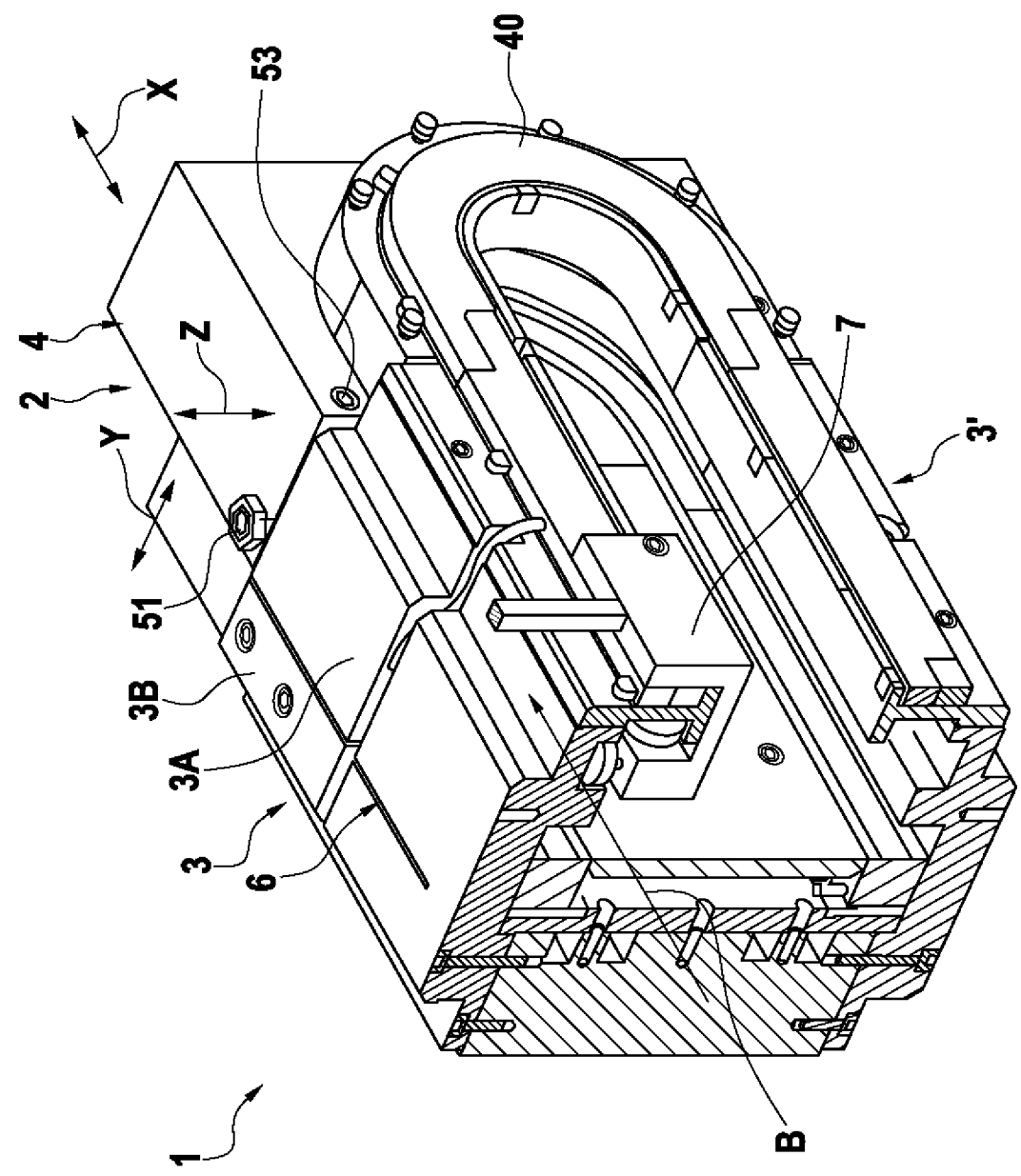
FIG. 2 shows a perspective partial view of the inventive transport system from FIG. 1, in the closed state.

As can further be seen from FIG. 1, the linear section part 3 additionally has a separating slot 6 which is configured parallel to the direction of movement B and divides the linear section part 3 into a first part 3A and a second part 3B, the U-shaped curve section 40 being fixed exclusively to the first part 3A. As a result, the linear section part 3 is flexibly designed and can be bent and adjusted via the horizontal third eccentric element 53 relative to the very dimensionally stable U-shaped curve section 40 of the curve section part 4 in the Z-direction. Although it is not visible in FIG. 1, the second linear section part 3' is likewise divided by a separating slot into a first part and a second part. A fine adjustment can occur here relative to the U-shaped curve section 40 in the Z-direction via the eccentric element 54. In so doing, transitions of the adjoining section parts are precisely aligned or, respectively, flushly fitted to one another; thus enabling an operatively reliable conveyance of runners to be ensured which can be moved on the transport section 2 and from which a runner 7 is depicted by way of example in FIG. 1. The length L1 of the elongated hole 55 is dimensioned here larger than a length L of the runner 7. As a result, after loosening the screws 46, the U-shaped curve section 40 along the guide elements 5A, 5B, 5C, 5D fixed to the linear section parts 3, 3' can thereby be pulled out in the direction X sufficiently far, i.e. maximally at a length L1. A runner 7 currently at hand can subsequently be removed from the transport section 2 without having to tilt the same or a new one can be inserted therein. By pushing back the U-shaped curved section part 4, the guide elements 5A, 5B, 5C, 5D are then pushed again into the boreholes of the linear section parts 3, 3' and are connected to the same in a form-fitting and force-fitting manner. The closed state of the transport system 1 is depicted in FIG. 2.

In order to dismount or mount runners 7, it is therefore possible according to the invention to open and close the transport section 2 between the U-shaped curve section 40 and the adjoining section parts of the transport system 1 using the lock device 5 without expending much time. In this connection, the lock device 5 makes possible a reproducible positioning of the curved section part 4 relative to the linear section parts 3, 3'. The guide elements 5A, 5B, 5C, 5D of the lock device 5 therefore have to be adjusted only once. A further manual fine positioning of the section parts is not required after closing the lock device 5.

The invention claimed is:
1. A transport system comprising:
a circumferentially closed transport section (2) that has a plurality of section parts, wherein the section parts comprise linear section parts (3) and a curved section part (4),
wherein the curved section part (4) has a U-shaped curve section (40) that defines a 180° deflection,
at least one runner (7) that can be moved along the transport section (2) in order to transport objects, and
a lock device (5) that is arranged between the U-shaped curve section (40) and adjacent section parts, the lock device (5) including at least one first rod-shaped guide element (5A) and one second rod-shaped guide element (5B);

characterized in that the lock device (5) comprises at least one eccentric element (51, 52), in order to change a relative position between the curved section part (4) and adjacent section parts;

characterized in that a first eccentric element (51) is disposed at the first rod-shaped guide element (5A) and a second eccentric element (52) at the second rod-shaped guide element (5B); and characterized in that the first rod-shaped guide element (5A) and a third rod-shaped guide element (5C) are disposed at a first free end (41) of the curved section part (4), wherein an eccentric element (51, 53) is disposed at each of the first and third rod-shaped guide elements (5A, 5C), the eccentric elements (51, 53) being disposed in directions (Y, Z) perpendicular to one another.

2. The transport system according to claim 1, wherein the first guide element (5A) connects a first free end (41) of the curved section part (4) to an adjacent section part and the second guide element (5B) connects a second free end (42) of the curved section part (4) to a further adjacent section part, wherein the curved section part (4) can be removed via the rod-shaped guide elements (5A, 5B) in order to be detached from the adjacent section parts.

3. The transport system according to claim 1, characterized in that each of the first and the second rod-shaped guide elements has an elongated hole (55) which is continuous in a direction perpendicular to a longitudinal direction of the guide element and in which an eccentric element (51, 52, 53, 54) is disposed.

4. The transport system according to claim 3, characterized in that the elongated hole (55) has a length (L1) in the longitudinal direction which is greater than a length (L) of the runner (7) in a direction of movement (B).

5. The transport system according to claim 1, further comprising a fourth rod-shaped guide element (5D), wherein the fourth rod-shaped guide element (5D) and the second rod-shaped guide element (5B) are disposed at a second free end (42) of the curve section (40), wherein an eccentric element (52, 54) is disposed at each rod-shaped guide element (5B, 5D), the eccentric elements (52, 54) being disposed in directions (Y, Z) perpendicular to one another.

6. The transport system according to claim 1, characterized in that a separating slot (6) is provided in the section part adjacent to the curved section part (4), said separating slot dividing the adjacent section part into a first part (3A) and a second part (3B), wherein the curved section part (4) is fixed exclusively to the first part (3A).

7. A transport system comprising:
a circumferentially closed transport section (2) that has a plurality of section parts, wherein the section parts comprise linear section parts (3) and a curved section part (4),
wherein the curved section part (4) has a U-shaped curve section (40) that defines a 180° deflection,
at least one runner (7) that can be moved along the transport section (2) in order to transport objects, and
a lock device (5) that is arranged between the curved section part (4) and adjacent section parts, the lock device (5) including at least one first rod-shaped guide element (5A) and one second rod-shaped guide element (5B);
characterized in that the lock device (5) comprises at least one eccentric element (51, 52), in order to change a relative position between the curved section part (4) and adjacent section parts;

characterized in that a first eccentric element (51) is disposed at the first rod-shaped guide element (5A) and a second eccentric element (52) at the second rod-shaped guide element (5B); and characterized in that each rod-shaped guide element has an elongated hole (55) which is continuous in a direction perpendicular to a longitudinal direction of the guide element and in which an eccentric element (51, 52, 53, 54) is disposed.

8. The transport system according to claim 7, wherein the first guide element (5A) connects a first free end (41) of the curved section part (4) to an adjacent section part and the second guide element (5B) connects a second free end (42) of the curved section part (4) to a further adjacent section part, wherein the curved section part (4) can be removed via the rod-shaped guide elements (5A, 5B) in order to be detached from the adjacent section parts.

9. The transport system according to claim 7, characterized in that the elongated hole (55) has a length (L1) in the longitudinal direction which is greater than a length (L) of the runner (7) in a direction of movement (B).

10. The transport system according to claim 7, further comprising a third rod-shaped guide element (5D), wherein the third rod-shaped guide element (5D) and the second rod-shaped guide element (5B) are disposed at a second free end (42) of the curve section (40), wherein an eccentric element (52, 54) is disposed at each rod-shaped guide element (5B, 5D), the eccentric elements (52, 54) being disposed in directions (Y, Z) perpendicular to one another.

11. The transport system according to claim 7, characterized in that a separating slot (6) is provided in the section part adjacent to the curved section part (4), said separating slot dividing the adjacent section part into a first part (3A) and a second part (3B), wherein the U-shaped curve section (40) is fixed exclusively to the first part (3A).

12. A transport system comprising:
a circumferentially closed transport section (2) that has a plurality of section parts that define a transport path, wherein the section parts comprise linear section parts (3) and a curved section part (4),
wherein the curved section part (4) has a U-shaped curve section (40) that defines a 180° deflection,
at least one runner (7) that can be moved along a direction of movement on the transport path in order to transport objects, and
a lock device (5) that is arranged between the U-shaped curve section (40) and adjacent section parts,
wherein the lock device (5) includes at least one first rod-shaped guide element (5A) and one second rod-shaped guide element (5B) that each include a portion that extends in an elongate direction parallel to the direction of movement,
wherein the first guide element (5A) connects a first free end (41) of the curved section part (4) to an adjacent section part and the second guide element (5B) connects a second free end (42) of the curved section part (4) to a further adjacent section part, and
wherein the curved section part (4) can be removed via the rod-shaped guide elements (5A, 5B) in order to be detached from the adjacent section parts.

13. The transport system of claim 12, wherein the lock device (5) includes an eccentric element (51, 52, 53, 54) engaged with the first guide element (5A, 5B, 5C, 5D) in order to change a relative position between the curved section part (4) and the linear section parts (3).

14. The transport system of claim 13, wherein the lock device includes two eccentric elements (51, 52, 53, 54) that are each engaged with a separate one of the two guide elements (5A, 5B, 5C, 5D) to move the curved section part (4) in at least two different, transverse directions.

15. The transport system of claim 12, wherein the first guide element (5A, 5B, 5C, 5D) includes an elongated hole (55) which is continuous in a direction perpendicular to a longitudinal direction of the first guide element (5A, 5B, 5C, 5D).

16. The transport system of claim 15, wherein the elongated hole (55) has a length (L1) in the longitudinal direction which is greater than a length (L) of the runner (7) measured along the direction of movement.

17. The transport system of claim 12, wherein a separating slot (6) is provided on one of the linear section parts (3), said separating slot dividing the linear part (3) into a first part (3A) and a second part (3B), wherein the curved section part (4) is fixed exclusively to the first part (3A).

18. The transport system of claim 12, wherein the curved section part (4) can be detached from one of the adjacent section parts by sliding the curved section part (4) or the adjacent section part over the first and second rod-shaped guide elements (5A, 5B), such that a gap is disposed between the curved section part (4) and the adjacent section part.

19. The transport system of claim 12, wherein a portion of each of the first and second guide elements projects from an end face of the curved section part or one of the adjacent section parts.

* * * * *